Nov. 26, 1968

C. S. TALLMAN 3,413,436

ARC WELDING APPARATUS

Filed Jan. 12, 1965

INVENTOR
Clifford S. Tallman

BY Connolly and Hutz
ATTORNEYS

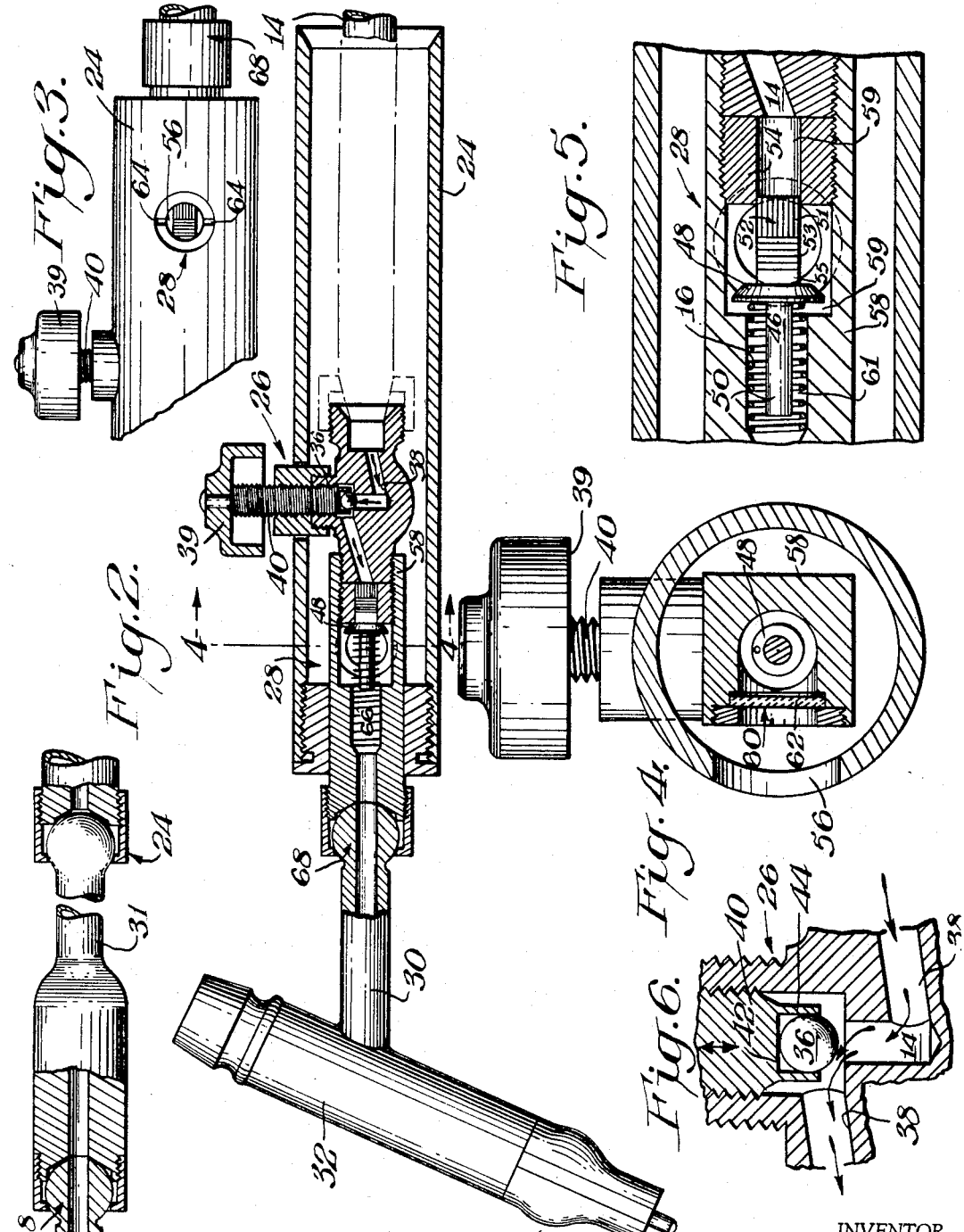

United States Patent Office 3,413,436
Patented Nov. 26, 1968

3,413,436
ARC WELDING APPARATUS
Clifford S. Tallman, New City, N.Y., assignor to Eutectic Corporation, Flushing, N.Y., a corporation of New York
Filed Jan. 12, 1965, Ser. No. 424,934
10 Claims. (Cl. 219—75)

ABSTRACT OF THE DISCLOSURE

A hand torch for arc welding utilizing a handle section, an inert gas conduit connected to a supply of inert gas, a gas throttling valve and a flow meter in said handle section, the flow meter also being in the handle section but downstream of the valve. The valve utilized being a manually rotated globe type valve. The flow meter utilized being a calibrated plunger moveable under a transparent section of the handle.

---

This invention relates to a gas-shielded arc welding apparatus and more particularly to such an apparatus which has a control valve for regulating the flow of gas to its non-consumable electrode.

In such arc-welding apparatuses the rate of flow of gas through the device is particularly important for obtaining proper weld deposits. For example, each metal requires a different pressure for shielding and the thickness of the metal indicates the tungsten electrode size to be used. The inert gas shields the surface and keeps the tungsten electrode cool. Accordingly for proper operation a different rate of inert gas flow is necessary for different size electrodes. These arc welding apparatuses generally include some means for indicating the rate of flow, such as a flow meter connected to the gas supply cylinder. When the torch is also provided with a flow control valve these valves are usually of the type which merely has on or off positions.

Locating the flow meter near the gas supply cylinder has a number of disadvantages. For example, the gas cylinder is usually too far from the torch for the operator to see the flow meter during welding operation. As a result, the welding operation must frequently be stopped and re-started to adjust the flow of gas. This is not only time consuming but also causes inferior weld deposits by increasing the chances of oxidation and other contaminations. Such remotely located meters are also subject to abuse by misuse. For example by being exposed, the meters are sometimes used as hooks for hoses or torches, which causes damage to the flow meters. Because these flow meters are generally of the floating ball-type, these meters can only be used in a vertical position. Accordingly, these flow meters could not be installed in the torch itself but had to be located in a remote position.

Not only are the flow meters of prior torches disadvantageous, but also the flow control valves used in the torches are subject to a number of drawbacks. For example, where such valves include only on and off positions, the operator must return to the gas containing cylinder to adjust the degree of flow. Where attempts have been made to incorporate a throttling valve in the torch, these valves are generally incapable of obtaining a fine degree of adjustment to accurately regulate the flow for the best possible weld deposit.

An object of this invention is to provide the above type torch using a simple and economical control valve for effectively regulating the flow of gas through the torch.

A further objective is to provide such a torch with a conveniently located and effective flow meter for accurately indicating the rate of flow through the torch.

In accordance with this invention, a throttling valve is advantageously located in the handle of the torch itself to not only control the opening and closing of the gas conduit in the torch but also to regulate the rate of flow through the torch. Conveniently, a flow meter is provided in the handle downstream from the valve for accurately and conveniently indicating the rate of flow of gas through the valve. The flow meter may carry indicia which could for example correspond to the particular electrode size used in a particular welding operation. At the beginning of the welding operation the valve may be easily manipulated by the operator until the proper rate of flow is indicated on the flow meter. Throughout the operation the operator may conveniently adjust the rate of flow without the necessity of stopping or re-starting the arc by, for example, simply judging from the arc conditions whether the rate is too high or too low.

In an advantageous form of this invention the throttling valve is in the form of a globe valve which includes a ball-type valve element controlled by a rotatable thumb operated knob to limit the distance the ball can move away from its seat in the gas conduit. The rotatable knob is threaded for fine accurate adjustment of the flow rate.

The flow meter may include a spring biased plunger which is positioned for engagement with a shoulder in the conduit to resist the flow of gas through the conduit. Additionally, the plunger includes indicia which can be seen by the operator through a transparent section of the handle. The spring reacting against the plunger is calibrated so that predetermined amounts of gas pressure is necessary to move the plunger and compress the spring predetermined amounts. The indicia on the plunger accordingly indicates the amount of gas pressure or rate of flow through the throttling valve.

Novel features and advantages of the present invention will become apparent to one skilled in the art from a reading of the following description in conjunction with the accompanying drawings wherein similar reference characters refer to similar parts and in which:

FIG. 2 is a side view partially broken away and in section of the torch shown in FIG. 1;

FIG. 3 is a side view in elevation of a portion of the torch shown in FIGS. 1–2;

FIG. 4 is a cross-sectional view taken through FIG. 2 along the line 4—4;

FIGS. 5 and 6 are cross-sectional views in elevation on an enlarged scale of portions of the torch shown in FIG. 2 in different phases of operation; and FIG. 7 is a side view in elevation showing a modified form of a portion of the torch shown in FIG. 2.

Figure 1:
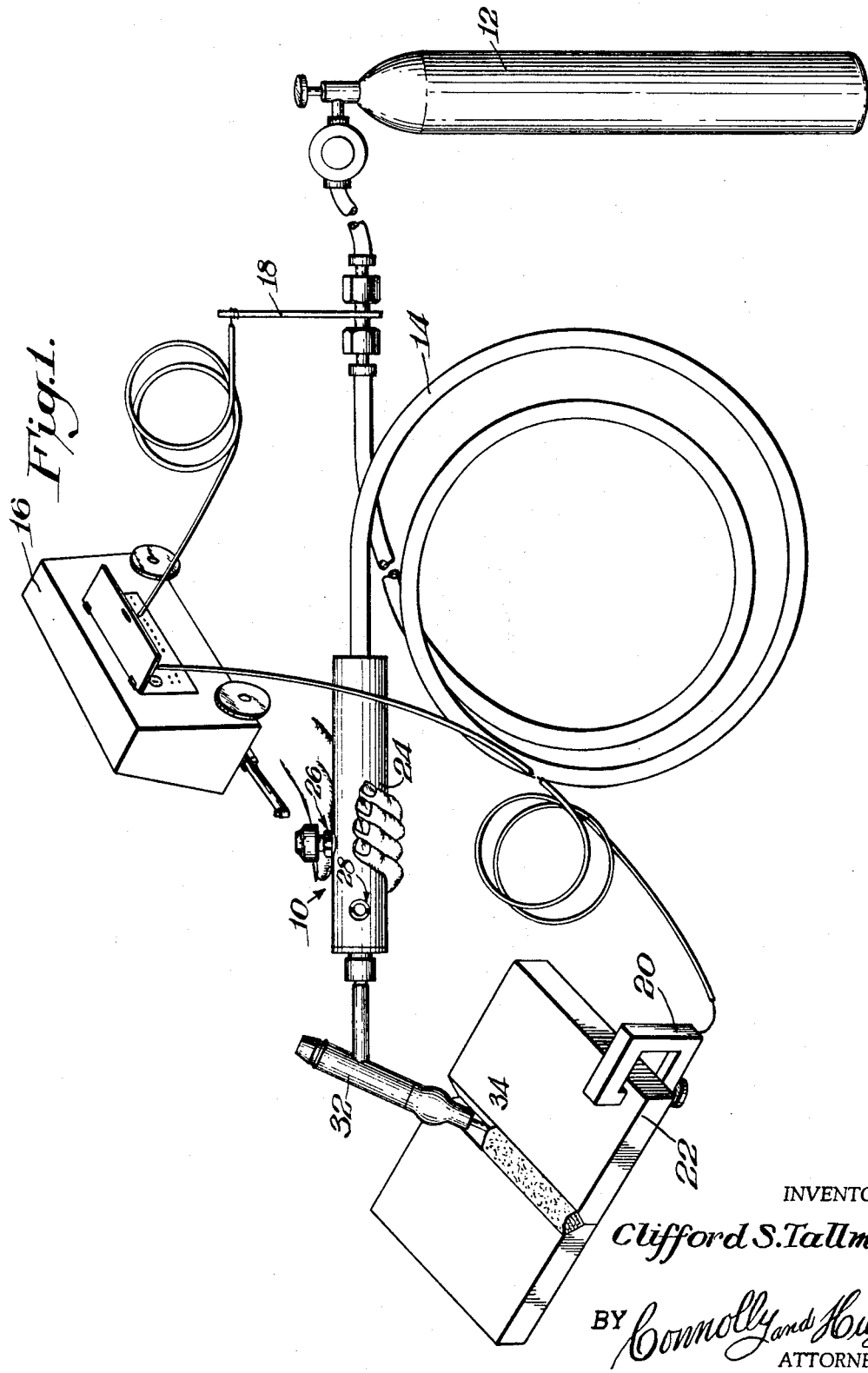
FIG. 1 is a perspective view of one embodiment of this invention.

As shown in FIG. 1 the arc welding apparatus 10 is supplied with inert gas from cylinder 12 through tube or conduit 14. The power for the welding operation is provided by generator 16. Stick electrode holder 18 is connected to generator 16 and contacts a conductive portion of torch 10 while the electrical circuit is completed by conductor 20 secured to the article 22 to be welded.

As also shown in FIG. 1 welding torch 10 includes a handle section 24 having a throttling valve 26 and a flow meter 28 downstream from valve 26. A universally connected neck or extension 30 is secured to handle 24 and to tip 32, while electrode 34 is secured in tip section 32.

At the beginning of a welding operation the operator adjusts valve 26 until flow meter 28 indicates that the proper rate of flow exists for the particular size electrode 34. Throughout the welding operation, the operator makes the necessary fine adjustments of rate of flow in accordance with, for example, the color of the welding arc, which indicates to the experienced operator when the rate of flow is too high or too low.

FIG. 2 shows the details of valve 26 and flow meter 28. As shown in FIGS. 2 and 6 valve 26 is a globe type valve which includes a ball valve element 36 seated upon shoulder 38 in conduit 14. Valve 26 also includes a knob 39 connected to threaded rod 40 and which can be conveniently rotated by the operator's thumb during the welding operation. The lower portion of rod 40 is hollowed-out to provide a roof 42 and a depending skirt 44. The flow of gas through conduit 14 reacts against ball 36 to force it against roof 42. In the position shown in FIG. 2, rod 40 is rotated so that skirt 44 is adjacent shoulder 38 with roof 42 maintaining ball 36 seated upon shoulder 38 to thus prevent flow of gas past ball 36. Accordingly, as shown in FIG. 2 valve 26 is in the off position.

FIG. 6 indicates the position of the various elements of valve 26 when rod 40 is rotated away from shoulder 38. As indicated in FIG. 6 the gas flow through conduit 14 unseats ball 36 and forces it upwards toward roof 42. Accordingly, the gas can flow through conduit 14 between shoulder 38 and ball 36. By this arrangement the rate of flow of gas through conduit 14 can be accurately controlled by simply rotating knob 39 of valve 26.

FIGS. 2 and 5 show the details of flow meter 28 which includes piston element 46, having an annular flange or head 48 between the plunger 50 and stem 52. Stem 52 is calibrated to indicate the rate of flow through conduit 14 as will later be described. The calibrations may include for example different color bands 51, 53 and 55 each of which corresponds to a particular size electrode. For example, a red color 55 may denote a 1/16 inch diameter tungsten electrode, the green band 53 may denote a 3/32 inch diameter tungsten electrode, and the yellow band 51 may denote a 1/8 inch diameter tungsten electrode. Although the color coding is particularly advantageous, in that the various colors may easily be distinguished, other suitable indicia may be inscribed on stem 52.

Piston 46 is resiliently biased to its closed position with head 48 seated against shoulder 54, by compression spring 66 reacting between head 48 and shoulder 67 in flow meter body 58. Spring 66 is calibrated to resist the force from the gas flowing through valve 26 and reacting against piston 46. As the rate of flow is increased spring 66 becomes compressed and stem 52 is moved in accordance with the compression of spring 66. FIG. 2, for example, shows the flow meter at a zero rate of flow when valve 26 is closed, while FIG. 5 shows the flow meter in an intermediate position.

A portion 56 of handle 24 is transparent or visually open as shown for example in FIGS. 3 and 4 and the flow meter body 58 is disposed under this transparent section. The body also contains a transparent section 60 which is sealed by a glass window 62 and which carries an index mark 64 as best shown in FIG. 3. Window or lens 62 is held in place by a gasket and lock nut. When valve 26 is opened the flow of gas moves stem 52 under window 62 so that the rate of flow can be easily determined by glancing through transparent section 56 of handle 24.

As shown in FIG. 5 flow meter body 58 includes an enlarged central bore 57 with smaller diameter inlet and outlet bores 59 and 61. Piston 46 reciprocates in small bore 61 while head 48 is maintained in large bore 57. Throughout the movement of piston 46 and head 48 some portion of stem 52 is always disposed in small bore 59. There is a close clearance of less than 0.001 inch, such as 0.0005 inch, between stem 52 and the walls of bore 59. This close clearance permits a sufficiently highly accurate reading for starting the arc at its proper original setting, and the later required fine adjustment can be accomplished by simply stroking handle 39 with the thumb.

As also shown in FIG. 2 stem or neck 30 is universally connected to handle 24 by ball joint 68. Accordingly, the angle and disposition of tip 32 can easily be varied with respect to handle 24 to reach otherwise inaccessible locations.

FIG. 7 shows a modification in which an extension rod 31 is secured between neck 30 and handle 24 so that the length of torch 10 can be increased for special operations. Rod 31 is also connected to handle 24 by a ball joint.

Another feature of this invention is that all exposed metal parts of welding apparatus 10 are additionally plastic coated by a dielectric insulated material which also funtions as a heat resistant coating.

What is claimed is:

1. An arc-welding apparatus comprising a torch having a handle section, an inert gas conduit in said torch extending through said handle section, means at one end of said conduit for connection to a supply of inert gas, means at the other end of said conduit for holding an electrode, a throttling valve in said handle section for controlling the rate of flow of gas through said conduit, and a flow meter in said handle section disposed in said conduit downstream from said throttling valve for indicating the rate of flow of gas through said valve wherein a portion of said handle section is transparent, said flow meter including a calibrated plunger, a shoulder being in said conduit, resilient means reacting against said plunger to urge said plunger against said shoulder, and the calibrated portion of said plunger being disposed for movement under said transparent section whereby the flow of gas through said conduit reacts against said resilient means to move said calibrated portion under said transparent section.

2. An apparatus as set forth in claim 1 wherein said plunger includes a piston head intermediate its ends, said resilient means reacting against said piston head, said calibrated portion of said plunger being a stem disposed on one side of said head, and said stem having indicia thereon whereby it is calibrated.

3. An apparatus as set forth in claim 2 wherein said indicia comprises a plurality of different colored bands.

4. An apparatus as set forth in claim 1 wherein said means for holding said electrode is located at the tip portion of said torch, a hollow connecting means securing said tip portion to said handle section, and said connecting means being secured to said handle section by a ball joint whereby the relative orientation of said tip portion with respect to said handle section may be varied.

5. An apparatus as set forth in claim 4 wherein connecting means includes a pair of hollow rods secured to each other, one of said rods being connected to said handle section and the other of said rods being connected to said tip portion, and one of said rods being removable whereby the length of said torch may be varied.

6. An apparatus as set forth in claim 1 wherein said flow meter includes a hollow body, said body having an enlarged central bore and a smaller diameter bore at each end of said central bore, said bores comprising a portion of said conduit, said torch having a transparent section disposed over said central bore, said flow meter including a plunger having a central annular flange in said central bore, the portion of said plunger on one side of said flange being a stem and the portion of said plunger on the other side of said flange being a piston, said stem being in the small bore upstream from said central bore with close clearance between said stem and the walls of said bore, said piston being in the small bore downstream from said central bore, resilient means in said downstream small bore reacting against said flange, and said stem being calibrated whereby the rate of flow through said conduit may be indicated through said transparent section when a portion of said calibrated stem is disposed into said central bore.

7. An arc welding apparatus comprising a torch having a handle section, an inert gas conduit in said torch extending through said handle section, means at one end of said conduit for connection to a supply of inert gas, means at the other end of said conduit for holding an electrode, and a flow meter in said handle section for indicating the rate of flow of gas through said conduit, said flow meter including a calibrated plunger, a shoulder being in said conduit, resilient means reacting against said plunger to urge said plunger against said shoulder, and the calibrated portion of said plunger being disposed for movement under said transparent section whereby the flow of gas through said conduit reacts against said resilient means to move said calibrated portion under said transparent section.

8. An apparatus as set forth in claim 7 wherein said plunger includes a piston head intermediate its ends, said resilient means reacting against said piston head, said calibrated portion of said plunger being a stem disposed on one side of said piston head, and said stem having indicia thereon whereby it is calibrated.

9. An apparatus as set forth in claim 8 wherein said indicia comprises a plurality of different colored bands.

10. An apparatus as set forth in claim 7 wherein said flow meter includes a hollow body, said body having an enlarged central bore and a smaller diameter bore at each end of said central bore, said bores comprising a portion of said conduit, said torch having a transparent section disposed over said central bore, said flow meter including a plunger having a central annular flange in said central bore, the portion of said plunger on one side of said flange being a stem and the portion of said plunger on the other side of said flange being a piston, said stem being in the small bore upstream from said central bore with close clearance between said stem and the walls of said small bore, said piston being in the small bore downstream from said central bore, resilient means in said downstream small bore reacting against said flange, and said stem being calibrated whereby the rate of flow through said conduit may be indicated through said transparent section when a portion of said calibrated stem is disposed into said central bore.

References Cited

UNITED STATES PATENTS

| | | | |
|---|---|---|---|
| 2,310,164 | 2/1943 | Prendergast et al. | 219—75 |
| 2,371,945 | 3/1945 | Barbeck | 219—75 X |
| 2,376,265 | 5/1945 | Meredith | 219—75 |
| 2,591,926 | 4/1952 | Gibson et al. | 219—74 |
| 2,788,429 | 4/1957 | Turner et al. | 219—74 |
| 2,907,865 | 10/1959 | Gibson | 219—74 |
| 3,042,791 | 7/1962 | Reeh | 219—74 X |
| 3,089,944 | 5/1963 | Mathews | 219—74 |
| 3,109,916 | 11/1963 | Kilburn et al. | 219—75 |
| 3,210,586 | 10/1965 | Clevett | 219—75 X |

RICHARD M. WOOD, *Primary Examiner.*

B. A. STEIN, *Assistant Examiner.*